Jan. 26, 1960 G. W. BAKER 2,922,201
WOODEN STUD PARTITION
Filed May 9, 1957 2 Sheets-Sheet 1

INVENTOR.
George W. Baker
BY
Olson, Mecklenburger, van Holst,
Pendleton, & Neuman. Attys.

Jan. 26, 1960  G. W. BAKER  2,922,201
WOODEN STUD PARTITION
Filed May 9, 1957  2 Sheets-Sheet 2
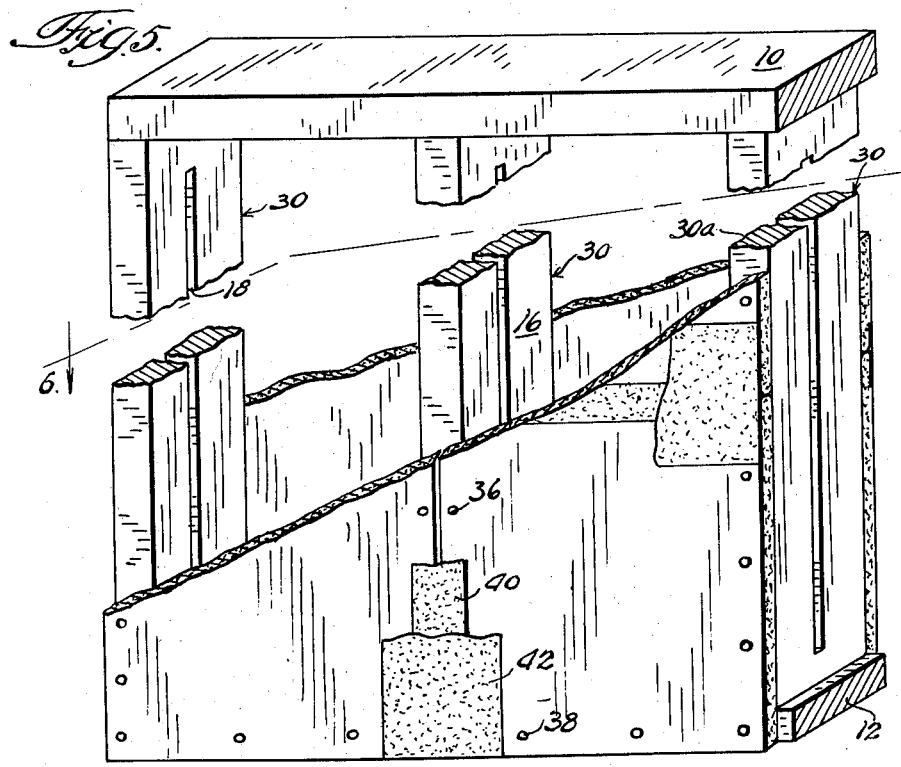
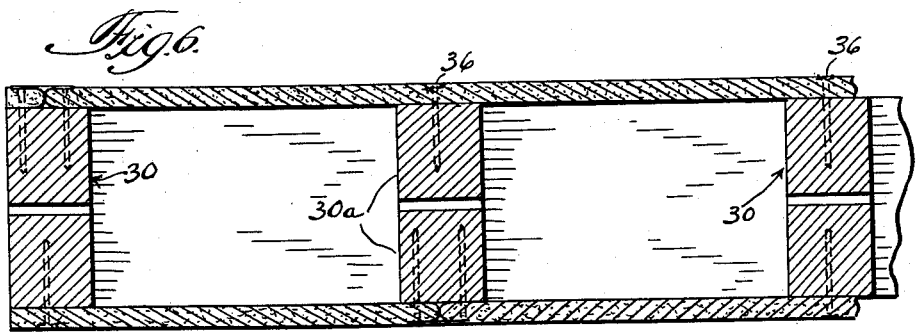
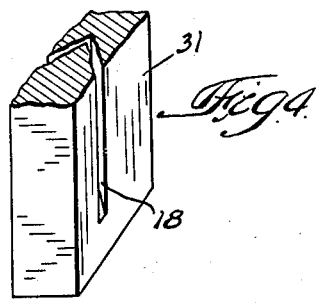
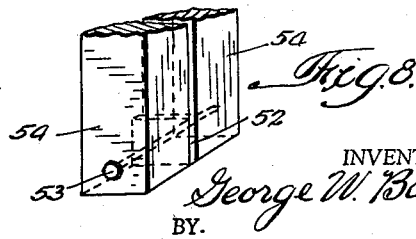
INVENTOR.
George W. Baker.
BY
Olson, Mecklenburger, von Holst,
Pendleton, & Neuman.

United States Patent Office 2,922,201
Patented Jan. 26, 1960

2,922,201

WOODEN STUD PARTITION

George W. Baker, Chicago Heights, Ill., assignor to United States Gypsum Company, Chicago, Ill., a corporation of Illinois Application May 9, 1957, Serial No. 658,188

3 Claims. (Cl. 20—4)

The present invention pertains to an improved wooden stud partition, and more particularly pertains to a partition employing wooden studs of novel design which impart to the partition a sound transmission resistance heretofore unknown in the art.

The use of 2 x 4 wooden studs as framing for partitions is well known in the building trade. A common type of construction utilizes these latter studs and has arranged on the wall-defining surfaces thereof gypsum wallboard or a gypsum lath surfaced with a layer of gypsum plaster. Although partitions formed in the latter manner have fairly good sound transmission resistance, it is an object of this invention to improve this latter resistance by means of a simple expedient which results in a very slight increase in total cost of construction.

The inability to provide adequate sound transmission resistance in a partition construction is a problem which has long been existent in the building industry and which has never been satisfactorily solved. The basic problem of building a partition which is pleasing in appearance and which requires no great expenditure for labor or materials has consistently defied proper solution. It has been found that by utilizing a basic law of physics the solution to a previous unsolvable problem has been provided. The solution as will hereinafter be made apparent requires little in the way of expenditures of any kind whether for material or labor. The discovery hereinafter set forth may be readily incorporated in partition constructions presently being erected by the ordinary skilled craftsman.

It has been found, therefore, that, if a 2 x 4 wooden stud member, still widely used in a large number of buildings presently being erected, is slotted either by a saw or by other equivalent means along the length thereof so as to divide the stud into two portions separated by an interposed air space, and which remain connected at their ends, the sound transmission resistance of the latter stud will be greatly improved. The air space or slot formed in the stud must terminate adjacent the longitudinal end limits of the stud member and is preferably disposed across the thinnest dimension of the stud. It is thus seen that such a stud member may comprise an integral member, although divided into two main portions along substantially the entire length thereof. The latter main portions resonate substantially independently of each other and are, therefore, substantially acoustically independent of each other.

The above method of construction produces decided advantages over such prior methods of decreasing sound transmission as the so-called staggered stud system. In the latter system, wall-defining surfaces are applied to separate, opposed rows of studs. The studs are spaced and arranged in such a manner that adjacent studs do not touch each other and clear the wall opposite that which they support. This latter construction is best erected by applying the studs to a 2 x 6 foundation board with one row of studs flush with one edge of the board and the adjacent studs flush with the other edge of the board. Consequently, the inner surface of each stud is about 2 inches from the opposed wall.

Utilizing such a construction the sound transmission resistance is increased from a value of 24 decibels to about 43 decibels. It is apparent that this latter construction not only costs more in material to erect; but, since twice the number of studs normally used are required and, in addition, since additional labor must be expended in the course of the construction, the expense involved is quite considerable. Still further, the partition width must be increased to prevent the opposed walls from contacting a common stud member.

The latter prior art construction is to be compared with one utilizing the above-mentioned stud which is the subject matter of this invention. The latter studs are used in the same number as is commonly employed in the building art and requires no additional expenditure of labor and only little in the way of processing.

It is an object, therefore, of this invention to provide a wooden stud member imparting improved sound transmission resistance which is particularly adapted for partition erection and which may be used in numbers equal to those commonly employed in the building art.

It is another object of this invention to provide a partition construction employing wooden stud members which increase the sound transmission resistance, although the studs are of the usual 2 x 4 dimensions and separated the usual 16 inches apart. Thus, savings in space, labor and material over prior art constructions will be effected since extra materials, unusual stud arrangements and extra labor in effecting other known sound-resistant constructions are eliminated.

It is a still further object of this invention to provide a partition employing an improved wood stud which imparts to the partition improved sound transmission resistance without the necessity of employing any special clips or other resilient means normally employed in partition construction of this type.

These and other objects of this invention will become more apparent upon proceeding with the following detailed description when read in the light of the accompanying drawing and appended claims.

In one embodiment of the provided wooden stud, a common 2 x 4 is longitudinally slotted for substantially the entire length thereof. The slot which preferably traverses the thinnest dimension of the 2 x 4 terminates adjacent the two longitudinal end limits thereof, that is, about 2 inches from either end limit. The thickness of the slot or air space between the two opposed portions of the 2 x 4 is preferably in the nature of ⅛ of an inch. The slot is preferably centrally disposed in the member so as to divide the stud into substantially two equal portions. As a result, an equal volume of wood is disposed on either side of the slot into which volume a nail of other equivalent securing means may be driven in the course of securing a gypsum board or other wall-defining surface to the stud. It is apparent that the nail members should not traverse the air space and enter the second stud portion disposed on the opposite side of the air space. If the latter were to occur, it is apparent that the two stud portions separated by the air space would not be acoustically independent of each other. Following the securing of the wallboards to the stud members, plaster or other surfacing material may be applied to the outer wallboard surface.

Since the opposed end limits of each stud are not traversed by the air space or slot, nails may be driven thereinto without danger of crossing the air space.

For a more complete understanding of this invention, reference should now be given to the drawings, wherein Figure 1 is a fragmentary perspective view of a partition construction employing the slotted wooden stud members provided by this invention;

Fig. 4 is a fragmentary perspective view of a second modified type of slot which may be employed in a wooden stud member;

Fig. 5 is a fragmentary perspective view of a partition construction utilizing a wooden stud construction employing a third type of slot disposed therein;

Fig. 6 is a sectional view taken on line 6—6 of Fig. 5;

Figure 1:
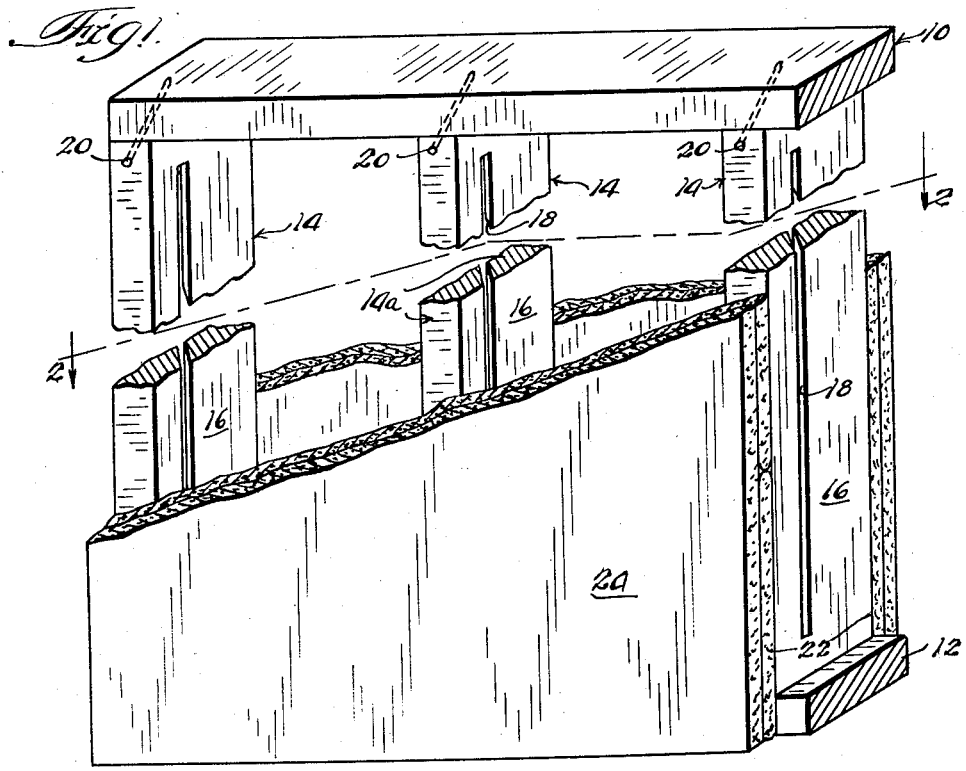

Referring now to Fig. 1, a fragment of a partition construction is illustrated. The latter construction comprises opposed ceiling and floor plates 10 and 12, respectively, to which vertically arranged wooden stud members 14 are secured at their opposed end limits. The latter stud members are ordinary 2 x 4's and have their face portions 16 slotted at 18 as illustrated. It will be noted from Fig. 1 that the slots 18 traverse the entire thickness of each stud 14 and, in addition, each slot runs substantially along the entire length of the stud in which disposed, terminating adjacent the opposed longitudinal end limits thereof. These latter unslotted end portions enable nails or other securing means such as nails 20 illustrated in Fig. 1 to be driven through the stud end portion and into the immediately adjacent plate member 10 or 12 without danger of traversing a slot 18 and without danger of affecting the sound transmission resistance.

The outer wall portions supported by the studs comprise gypsum lath 22 which is in the form of vertical sections which are nailed or otherwise secured to the supporting stud members 14 and have disposed on the outer surface thereof a layer of plaster 24. It will be noted from Fig. 1 that the slot 18 is arranged across the thickness of each stud 14 so as to divide the latter studs into opposed substantially equal portions. Consequently, equal portions of the stud width will be available for engagement with the nail members securing the gypsum lath thereto.

The function of the air space or slot 18 in the illustrated partition of Fig. 1 is believed apparent. Because of the air space, any sound waves impinging against the outer surface of one surface of the partition will not be directly transmitted to the opposed wall surface of the partition. Because of the two stud half portions separated by the interposed air space, the vibration induced in one stud half portion will be substantially dispersed and only a slight vibration or sound will be imparted to the adjacent stud half portion disposed on the opposed side of the slot 18.

Figure 2:
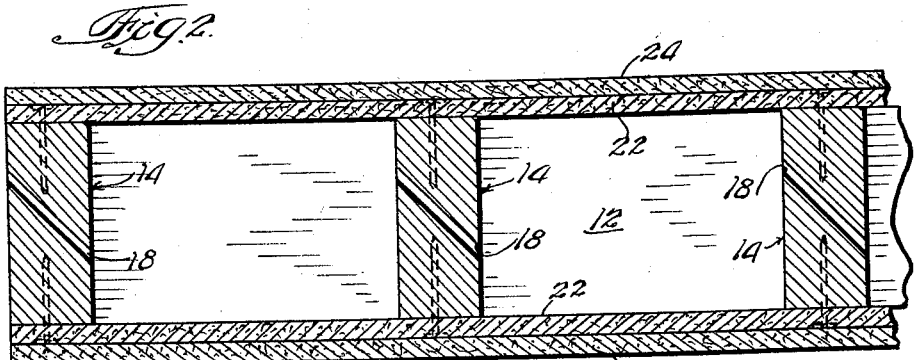
Fig. 2 is a transverse sectional view taken on line 2—2 of Fig. 1.

The partition of Figs. 1 and 2 is thus seen to comprise one embodiment of a partition utilizing the inventive principle herein disclosed. It should be noted that the cross-sectional configuration of the slot employed in the stud member is not of primary importance insofar as sound transmission resistance is concerned, but may affect in some degree the rigidity and load-bearing capacity of each stud portion as will hereinafter be explained. The substantially V-shaped slot 18 of stud 31 depicted in Fig. 4 functions as do slots 18 in Figs. 1 and 2 to divide the stud into two portions and as a result sound transmission resistance of a partition utilizing the same is increased.

By utilizing a diagonal slot such as that illustrated in Figs. 1 and 2, the resistance of each stud portion disposed on opposed sides of the air space or slot 18 to deflection is increased. The added increase in rigidity is due to the fact that the deflection of each stud portion varies inversely as the cube of the depth thereof. Consequently, with the diagonal slot, since one side portion of each stud portion 14a will exceed half the width of the stud 14, the cube relationship between the deflection and thickness assures the fact that each stud half 14a will be possessed of greater rigidity than halves 30a of the studs 30.

Except for the differences in rigidity of each stud portion defined by an air space or slot disposed across the thickness of a stud member, the disposition of the slots 18 in a stud member is not of critical importance. It should be remembered that the resistance to sound transmission has its basis in the acoustically independent stud portions which do not transmit the sound vibratory motion to the adjacent stud portion because of the intervening air space.

Figures 3, 7:
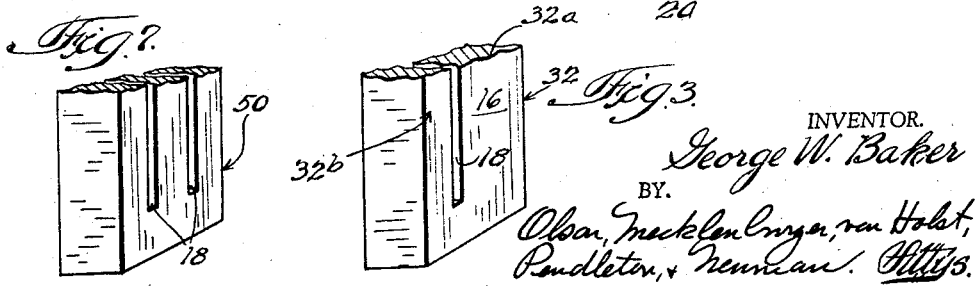
Fig. 3 is a fragmentary perspective view of a modified type of slot which may be formed in a wooden stud member.
Fig. 7 is a fragmentary perspective view of a partition construction utilizing a wooden stud construction employing a fourth type of slot disposed therein; and, Fig. 8 illustrates a modified stud construction composed of a plurality of discrete parts.

In Fig. 3 a stud member 32 is illustrated in which the air space 18 is disposed normally to the stud face 16 but is disposed closer to one longitudinal edge surface of the stud 32 than the opposed longitudinal edge surface. It is quite apparent, therefore, that the thicker stud portion 32a will have greater rigidity and resistance to deflection than will the opposed stud portion 32b in accordance with the above-mentioned rule that the deflection of the stud portion varies inversely as the cube of the depth of such portion.

In Fig. 5, as already has been mentioned, stud members 30 are illustrated in which elongated slots 18 have been formed normal to the opposed faces 16 of the studs 30. In the partition construction of Fig. 5, gypsum wallboards are attached or secured to the edge surfaces of the studs 30 by means of nail members 36. Nail members 38 are also employed to secure the gypsum wallboard to the floor plate 12 and the overlying ceiling plate 10, to which the studs 30 are nailed, at their opposed end portions. The wallboard joints of Fig. 5 may be reinforced with a tape 40 and the latter tape may be covered with a cement 42 as illustrated. A transverse section of the partition of Fig. 5 is illustrated in Fig. 6.

In the above described partitions, each slot 18 is approximately ⅛ of an inch wide and extends through the entire thickness of each stud and along substantially the entire length thereof, terminating approximately 2 inches from each end. As has been above mentioned, each stud portion disposed on one side of the stud slots should be of sufficient thickness relative to the nail members employed so as to prevent the latter nail members from traversing one stud portion and entering the other, thereby greatly reducing the sound transmission resistance of the partition. The slots illustrated in the various stud members may be readily formed by running a saw blade down the length of the wooden studs. The following table presents the sound transmission resistance of various partition constructions:

*Table A*

Sound transmission loss in decibels (1) Studs slotted in the middle to within 2 inches of each end and placed 16 inches on center, gypsum lath coated with ½ inch of plaster doubled back and sanded 2½ to 1, upon each surface _____ 50

(2) Same as 1, excepting slot is placed 1 1/16 inches from one edge instead of in the middle _____ 49

(3) Regular 2 x 4 studs, gypsum lath and plaster. Same construction as 1 and 2 but without the slot _____ 45

(4) Studs slotted in the middle to within 2 inches of each end and placed 16 inches on centers, ½ inch gypsum wallboard nailed horizontally, joint taped, one vertical joint on each face but upon different studs _____ 43

|   | Sound transmission loss in decibels |
|---|---|
| (5) Same as 4, excepting slot is placed 1 1/16 inches from one edge of the stud instead of in the middle | 43 |
| (6) Same as 4 and 5, excepting regular 2 x 4 wooden studs were used without slots and placed 16 inches on centers with ½ inch gypsum wallboard on each face nailed horizontally, joints taped, one vertical joint on each face but upon different studs | 34 |
| (7) Two rows of regular wooden studs placed 16 inches on center using 2 x 6 plates. Adjacent studs staggered and spaced 8 inches apart, ⅝ inch gypsum wallboard placed horizontally, joints taped, one vertical joint on each face but upon different studs | 43 |

It will be noted from the above table that the gypsum lath and plaster partition utilizing studs slotted in the middle will effect the greatest sound transmission loss. The latter construction is closely followed in sound transmission loss by a partition construction which is similar to number 1, but in which the stud slot is disposed closer to one edge surface than the other in the manner illustrated in Fig. 3.

The next partition construction in the above table comprises a construction which is similar to the constructions 1 and 2 but in which the stud members are not slotted. As a result, it will be noted that the sound transmission loss is only 45 decibels thereby making apparent the increased sound resistance imparted to a partition construction utilizing a slotted stud member.

Partitions 4 and 5 of the above table have sound transmission losses of 43 decibels and employ slotted stud members. It will be noted that the latter partition constructions employ a ½ inch gypsum wallboard and do not have a plaster surface. The latter plaster surface further adds to the sound-transmission resistance and is present in the partition constructions of 1 through 3 and, therefore, accounts for the lower sound transmission loss of the partition constructions 4 and 5. It will be noted that in the partition construction 4, the studs are slotted in the middle. In the partition construction 5, the stud slots are arranged closer to one edge surface than the other. It is seen that the acoustical resistance is unaffected by this latter difference in slot disposition in some instances.

The increased benefits in sound transmission loss, by utilizing slotted wooden studs, are more dramatically illustrated in partition construction 6 utilizing unslotted studs when compared with constructions 4 and 5. Partition construction 6 has a sound transmission loss which is 9 decibels less than those of the partitions 4 and 5 in the table.

Partition construction 7 has a sound transmission loss equal to partition constructions 4 and 5 utilizing the slotted studs of this invention. However, the construction 7 of the table employs two rows of regular wooden studs plus a ⅝ inch gypsum wallboard. Despite the more elaborate and expensive construction, the sound transmission loss of construction 7 is only equal to constructions 4 and 5 and inferior to constructions 1 and 2 employing slotted wooden studs.

It has been made apparent from the above that a number of partition constructions may be utilized by employing the novel concepts above presented. The manner in which the stud traversing slot is formed is relatively unimportant. The slot, however, should be disposed across the thinnest dimension of the stud and divide the stud width into two stud portions, each of which may receive a securing means which is of such a length so as not to enter that stud portion disposed on the opposite side of the slot.

In Fig. 7 a stud member 50 is illustrated which has two slots 18 disposed along the length of the stud member; the number of slots is immaterial. However, a sufficient thickness of stud should be available for engaging a securing means. It is believed apparent that the width of the stud slots is immaterial. The slots need only be wide enough to insure the presence of two stud portions which do not contact each other and may be of any width that is compatible with proper stud strength.

The benefits of the inventive concepts above disclosed may also be obtained by employing stud members which are not necessarily of integral construction. For instance two discrete stud portions may have two shim pieces interposed therebetween at opposed end limits thereof in the manner illustrated in Fig. 8. The shim pieces 52 disposed between the opposed stud-defining portions 54 will enable an elongate slot to be formed similar to slots 18 in the previously discussed stud members which will function to increase the sound transmission loss of a partition in which employed. A nail member 53 or other equivalent means will serve to maintain the stud portions in an assembled condition. Although the latter-described stud assembly will work to advantage, it should be noted that an integral stud assembly is greatly preferred.

In view of the many modifications which may be made and which will still remain within the inventive concepts herein disclosed, it is intended that the invention be limited only by the scope of the appended claims.

I claim:

1. In a stud having opposed surfaces for engaging discrete surface-defining means or the like against which sound waves normally impinge, the improvement comprising opposed stud portions having an air space interposed therebetween, each of said stud portions having one of said opposed surfaces for engaging discrete surface-defining means, said air space extending for substantially the entire length of said stud whereby said stud portions are substantially acoustically independent of each other.

2. In a partition having improved resistance to sound transmission, the combination comprising a plurality of spaced studs, each of said studs having at least one air space traversing the stud in which disposed and dividing such stud into a plurality of substantially acoustically independent portions, and opposed surface-defining means supported by opposed portions of said studs, said stud air spaces being disposed between said opposed surface-defining means in the normal assembled position.

3. In a partition resistant to sound transmission, the combination comprising a plurality of studs, each of said studs comprising a plurality of substantially independently vibrating portions having air spaces interposed between said independently vibrating portions, support means engaging and maintaining said studs in fixed positions, surface-defining means secured to opposed substantially independently vibrating portions of said studs, and securing means for securing said surface-defining means to said independently vibrating stud portions.

References Cited in the file of this patent

UNITED STATES PATENTS

| 596,217 | Rapp | Dec. 28, 1897 |
| 1,483,366 | Mazer | Feb. 12, 1924 |
| 2,301,538 | Guyer | Nov. 10, 1942 |
| 2,373,808 | Brown | Apr. 17, 1945 |
| 2,390,262 | Mazer | Dec. 4, 1945 |
| 2,413,568 | Hurley | Dec. 31, 1946 |